United States Patent
Kanazawa et al.

(10) Patent No.: US 7,925,895 B2
(45) Date of Patent: Apr. 12, 2011

(54) DATA MANAGEMENT APPARATUS, DATA MANAGEMENT METHOD, AND STORAGE MEDIUM

(75) Inventors: Keizen Kanazawa, Toyko (JP); Masaya Okuda, Kawasaki (JP)

(73) Assignee: Kyocera Mita Corporation (JP)

( * ) Notice: Subject to any disclaimer, the term of this patent is extended or adjusted under 35 U.S.C. 154(b) by 1291 days.

(21) Appl. No.: 11/357,532

(22) Filed: Feb. 17, 2006

(65) Prior Publication Data

US 2006/0190426 A1 Aug. 24, 2006

(30) Foreign Application Priority Data

Feb. 22, 2005 (JP) .............................. P2005-045239
Feb. 22, 2005 (JP) .............................. P2005-045240
Jul. 6, 2005 (JP) .............................. P2005-197370

(51) Int. Cl.
*G06F 11/30* (2006.01)
*G06F 12/14* (2006.01)
*G06F 7/04* (2006.01)
*G06F 17/30* (2006.01)

(52) U.S. Cl. ........................... 713/193; 726/26; 713/194

(58) Field of Classification Search .................... 13/194; 726/26; 713/193, 194
See application file for complete search history.

(56) References Cited

U.S. PATENT DOCUMENTS

| | | | | |
|---|---|---|---|---|
| 5,857,021 A | | 1/1999 | Kataoka | 380/4 |
| 6,012,146 A | * | 1/2000 | Liebenow | 726/17 |
| 6,097,814 A | | 8/2000 | Mochizuki | 380/44 |
| 6,134,660 A | * | 10/2000 | Boneh et al. | 713/193 |
| 6,249,866 B1 | * | 6/2001 | Brundrett et al. | 713/165 |
| 6,333,983 B1 | * | 12/2001 | Enichen et al. | 380/273 |
| 6,363,149 B1 | * | 3/2002 | Candelore | 380/45 |
| 6,947,556 B1 | * | 9/2005 | Matyas et al. | 380/29 |
| 6,986,043 B2 | * | 1/2006 | Andrew et al. | 713/166 |
| 7,020,780 B1 | | 3/2006 | Mochizuki | 713/193 |
| 7,023,998 B2 | * | 4/2006 | Garay et al. | 380/277 |
| 7,124,301 B1 | | 10/2006 | Uchida | 713/189 |
| 7,181,016 B2 | * | 2/2007 | Cross et al. | 380/281 |
| 7,203,317 B2 | * | 4/2007 | Kallahalla et al. | 380/278 |

(Continued)

FOREIGN PATENT DOCUMENTS

CN 1324028 A 11/2001

(Continued)

OTHER PUBLICATIONS

Chinese Office Action dated Aug. 3, 2007 with translation.

(Continued)

*Primary Examiner* — Michael Pyzocha
(74) *Attorney, Agent, or Firm* — Ostrolenk Faber LLP

(57) ABSTRACT

A data management apparatus which includes: a removable storage device; a nonvolatile memory which saves a first conversion key; a first encrypting device which converts a datum to be saved in the storage device into an encrypted datum by the first conversion key; a first writing device which writes the encrypted datum into the storage device; a first reading device which reads the encrypted data; a first decrypting device having a second conversion key which decrypts the encrypted datum by the second conversion key; a second encrypting device having a third conversion key which encrypts the second conversion key by the third conversion key, and converts the second conversion key into a fourth conversion key; a second writing device which writes the fourth conversion key into the storage device; a second reading device which reads the fourth conversion key; and a second decrypting device which decrypts the fourth conversion key.

3 Claims, 7 Drawing Sheets

U.S. PATENT DOCUMENTS

| | | | |
|---|---|---|---|
| 7,298,845 B2 * | 11/2007 | Tatebayashi et al. | 380/201 |
| 7,418,602 B2 * | 8/2008 | Yoshida et al. | 713/193 |
| 7,444,306 B2 * | 10/2008 | Varble | 705/52 |
| 2001/0056541 A1 * | 12/2001 | Matsuzaki et al. | 713/193 |
| 2002/0114468 A1 | 8/2002 | Nishimura | |
| 2002/0166072 A1 * | 11/2002 | Cromer et al. | 713/202 |
| 2003/0028765 A1 * | 2/2003 | Cromer et al. | 713/164 |
| 2004/0003267 A1 * | 1/2004 | Strom et al. | 713/193 |
| 2004/0172538 A1 | 9/2004 | Satoh | 713/175 |
| 2004/0264698 A1 | 12/2004 | Oda | 380/269 |
| 2005/0039044 A1 | 2/2005 | Gassho | 713/201 |
| 2005/0086471 A1 * | 4/2005 | Spencer | 713/165 |
| 2005/0232415 A1 * | 10/2005 | Little et al. | 380/28 |
| 2006/0039554 A1 * | 2/2006 | Fry | 380/29 |
| 2006/0101267 A1 | 5/2006 | Takamura et al. | |

FOREIGN PATENT DOCUMENTS

| | | |
|---|---|---|
| JP | 58-178456 | 10/1983 |
| JP | 07-287655 | 10/1995 |
| JP | 09-134311 | 5/1997 |
| JP | 10-198558 | 7/1998 |
| JP | 11-161552 | 6/1999 |
| JP | 2001-523064 | 11/2001 |
| JP | A-2002-245427 | 8/2002 |
| JP | 2002-260326 | 9/2002 |
| JP | 2002-292980 | 10/2002 |
| JP | A-2002-368735 | 12/2002 |
| JP | 2003-131950 | 5/2003 |
| JP | 2003-195758 | 7/2003 |
| JP | 2003-303136 | 10/2003 |
| JP | 2003-333030 | 11/2003 |
| JP | 2004-013763 | 1/2004 |
| JP | 2004-118232 | 4/2004 |
| JP | 2004-201038 | 7/2004 |
| JP | 2004-355268 | 12/2004 |
| JP | 2005-020346 | 1/2005 |
| JP | 2005-130261 | 5/2005 |
| JP | 2005-258558 | 9/2005 |
| WO | WO 99/25086 | 5/1999 |
| WO | WO 02/03271 A1 | 1/2002 |
| WO | WO 03/021406 | 3/2003 |
| WO | WO03/107171 | 12/2003 |

OTHER PUBLICATIONS

Notice of Allowance for Japanese Patent Application No. JP 2005-045239 mailed Apr. 6, 2010.

* cited by examiner

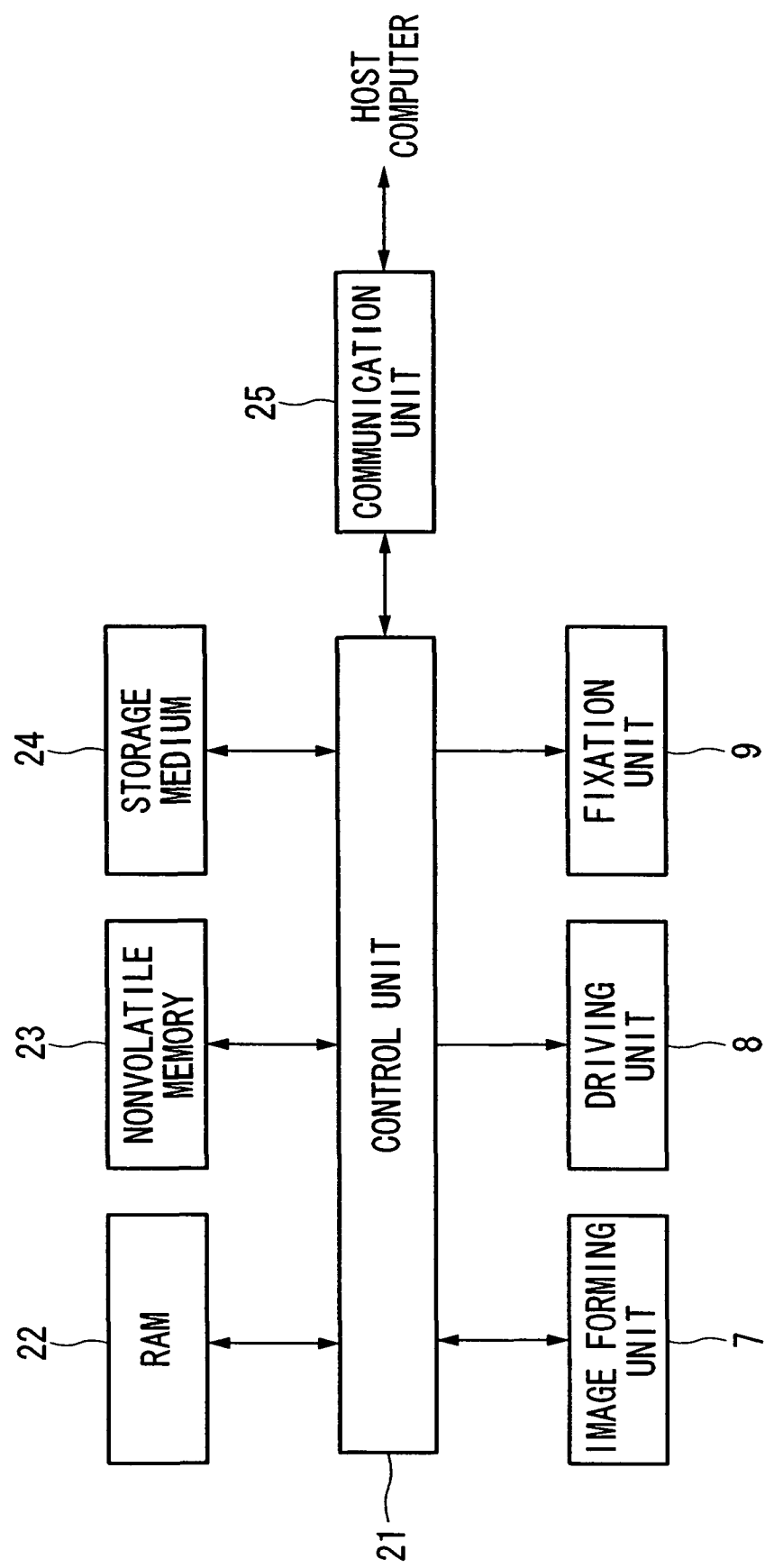

DATA MANAGEMENT APPARATUS, DATA MANAGEMENT METHOD, AND STORAGE MEDIUM

BACKGROUND OF THE INVENTION

1. Field of the Invention

The present invention relates to a data management device which has a nonvolatile storage apparatus such as a hard disc drive, a printer, a facsimile, a copying machine, a server machine, and a personal computer; a method for managing data; and a storage medium.

Priority is claimed on Japanese Patent Application No. 2005-45239 and No. 2005-45240, filed Feb. 22, 2005, and Japanese Patent Application No. 2005-197370, filed Jul. 6, 2005 the content of which is incorporated herein by reference.

2. Description of Related Art

In printers and other devices, font data and job data which are sent from a host computer are saved in a removable hard disc (HDD). Therefore, there is a risk of data leakage when the HDD is taken away.

Conventionally, some arts for preventing data leakage described hereinbelow are known. Japanese Unexamined Patent Application, First Publication No. 2002-260326 discloses an art which scrambles video data or audio data when saved in a storage medium, using a key which is made by encrypting unique information to a reproducing device by the identifier of the storage medium. Japanese Unexamined Patent Application, First Publication No. 2003-303136 discloses an art which deletes a key after reproducing encrypted data saved in a storage medium such as a compact disc (CD). Japanese Unexamined Patent Application, First Publication No. 2003-131950 discloses an art which encrypts digitalized copyrighted works, using information unique to a device, and saves the encrypted data in a storage device such as a memory card.

However, these aforementioned arts do not have sufficient security. In addition, the data becomes useless when the key is broken because of an error in operation or for other reasons, since these arts do not consider the case in which a key for decryption is broken.

SUMMARY OF THE INVENTION

Concerning the aforementioned circumstances, an object of the present invention is to provide a data management apparatus, a method for data management, and a storage medium which have a higher security and are able to reproduce a key for decryption even when the key is broken.

To achieve the above-described purpose, the present invention provides a data management apparatus including: a removable storage device; a nonvolatile memory which saves a first conversion key; a first encrypting device which converts a datum to be saved in the storage device into an encrypted datum by the first conversion key; a first writing device which writes the encrypted datum into the storage device; a first reading device which reads the encrypted data from the storage device; a first decrypting device having a second conversion key which decrypts the encrypted datum by the second conversion key; a second encrypting device having a third conversion key which encrypts the second conversion key by the third conversion key, and converts the second conversion key into a fourth conversion key; a second writing device which writes the fourth conversion key into the storage device; a second reading device which reads the fourth conversion key from the storage device; and a second decrypting device which decrypts the fourth conversion key by the third conversion key.

In addition, the present invention provides a storage medium having a computer program stored therein for a computer having a removable storage device and a nonvolatile memory which saves a first conversion key, the computer program including: a first step of converting a datum to be saved in the storage device into an encrypted datum by the first conversion key; a second step of writing the encrypted datum into the storage device; a third step of reading the encrypted datum from the storage device; a fourth step of decrypting the encrypted datum by a second conversion key; a fifth step of encrypting the second conversion key by a third conversion key, and converting the second conversion key into a fourth conversion key; a sixth step of writing the fourth conversion key into the storage device; a seventh step of reading the fourth conversion key from the storage device; and an eighth step of decrypting the fourth conversion key by the third conversion key.

Furthermore, the present invention provides a method for data management which is applicable to a computer having a removable storage device and a nonvolatile memory which saves a first conversion key, the method for data management including: a first step of converting a datum to be saved in the storage device into an encrypted datum by the first conversion key; a second step of writing the encrypted datum into the storage device; a third step of reading the encrypted datum from the storage device; a fourth step of decrypting the encrypted datum by a second conversion key; a fifth step of encrypting the second conversion key by a third conversion key, and converting the second conversion key into a fourth conversion key; a sixth step of writing the fourth conversion key into the storage device; a seventh step of reading the fourth conversion key from the storage device; and an eighth step of decrypting the fourth conversion key by the third conversion key.

Furthermore, the present invention provides a data management apparatus including: a removable storage device; a nonvolatile memory which generates and saves the first conversion key; a first encrypting device having a second conversion key which encrypts the first conversion key by the second conversion key, and converts the first conversion key into a third conversion key; a first writing device which writes the third conversion key into the storage device; a second encrypting device having a fourth conversion key which encrypts the third conversion key by the fourth conversion key, and converts the third conversion key into a fifth conversion key; a datum encrypting device which converts a datum to be saved in the storage device into an encrypted datum by the fifth conversion key; a datum writing device which writes the encrypted datum into the storage device; a datum reading device which reads the encrypted datum from the storage device; a datum decrypting device which decrypts the encrypted datum by the fifth conversion key; and a deleting device which deletes the fifth conversion key after encryption by the datum encrypting device and after decryption by the datum decrypting device.

In the data management apparatus of the present invention, a unique key to the data management apparatus itself may be used as the fourth conversion key.

Furthermore, the present invention provides a storage medium having a computer program stored therein for a computer having a removable storage device and a nonvolatile memory which generates and saves a first conversion key, the computer program including: a first step of encrypting the first conversion key by the second conversion key, and converting the first conversion key into a third conversion key; a second step of writing the third conversion key into the storage device; a third step of encrypting the third conversion key by a fourth conversion key, and converting the third conversion key into a fifth conversion key; a fourth step of converting a datum to be saved in the storage device into an encrypted datum by the fifth conversion key; a fifth step of writing the encrypted datum into the storage device; a sixth step of reading the encrypted datum from the storage device; a seventh step of decrypting the encrypted datum by the fifth conversion key; and an eighth step of deleting the fifth conversion key after encryption by the datum encrypting device and after decryption by the datum decrypting device.

Furthermore, the present invention provides a method for data management which is applicable for a computer having a removable storage device and a nonvolatile memory which saves a first conversion key, the method for data management including: a first step of encrypting the first conversion key by the second conversion key, and converting the first conversion key into a third conversion key; a second step of writing the third conversion key into the storage device; a third step of encrypting the third conversion key by a fourth conversion key, and converting the third conversion key into a fifth conversion key; a fourth step of converting a datum to be saved in the storage device into an encrypted datum by the fifth conversion key; a fifth step of writing the encrypted datum into the storage device; a sixth step of reading the encrypted datum from the storage device; a seventh step of decrypting the encrypted datum by the fifth conversion key; and an eighth step of deleting the fifth conversion key after encryption by the datum encrypting device and after decryption by the datum decrypting device.

Furthermore, the present invention provides a data management apparatus including: a removable storage medium having an authentication key stored therein; an encryption key generating device which generates an encryption key based on a preset master key when a power supply is turned on; and a collating device which collates the authentication key and the encryption key, wherein the data management apparatus writes a datum into the storage medium or reads a datum from the storage medium when a result of a collation carried out by the collating device satisfies a predetermined condition.

The data management apparatus of the present invention may further include a format device which formats the storage medium, generates an authentication key based on the master key, and writes the authentication key in the storage medium when a result of a collation carried out by the collating device does not satisfy the predetermined condition.

In the data management apparatus of the present invention, an identification number of the data management device or a datum set by a user may be used as the master key.

Furthermore, the present invention provides a storage medium having a computer program stored therein for a computer having a removable storage medium in which an authentication key is saved, the processing by the computer program including the steps of: generating an encryption key based on a preset master key when a power supply is turned on; collating the authentication key and the encryption key; writing a datum into the storage medium or reading a datum from the storage medium when a result of a collation in the step of collating satisfies a predetermined condition; and formatting the storage medium, generating an authentication key based on the master key, and writing the authentication key in the storage medium when a result of a collation carried out by the collating device does not satisfy the predetermined condition.

Furthermore, the present invention provides a method for data management which is applicable to a computer having a removable storage medium in which an authentication key is saved, the method for data management including the steps of: generating an encryption key based on a preset master key when a power supply is turned on; collating the authentication key and the encryption key; writing a datum into the storage medium or reading a datum from the storage medium when a result of a collation in the step of collating satisfies a predetermined condition; and formatting the storage medium, generating an authentication key based on the master key, and writing the authentication key in the storage medium when a result of a collation carried out by the collating device does not satisfy the predetermined condition.

BRIEF DESCRIPTION OF THE DRAWINGS

FIG. 6 is a block diagram showing an image forming device (a printer) to which a data management apparatus of a third embodiment of the present invention is applied.

DETAILED DESCRIPTION OF THE INVENTION

Figure 1:
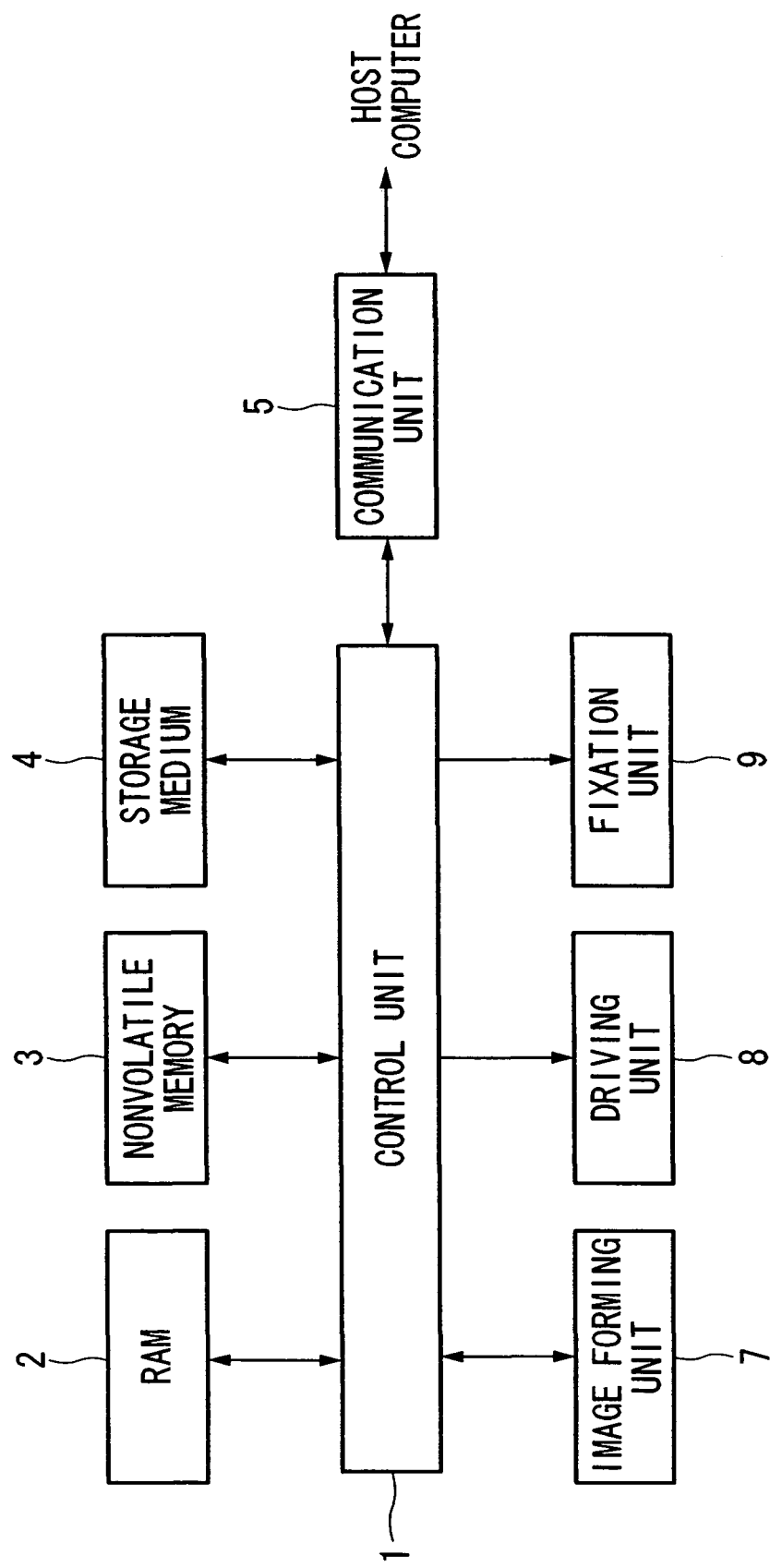
FIG. 1 is a block diagram showing an image forming device (a printer) to which a data management apparatus of a first embodiment of the present invention is applied.

Several embodiments of the present invention are described hereinbelow with reference to the drawings. FIG. 1 is a block diagram showing an image forming device (a printer) to which a data management apparatus of a first embodiment of the present invention is applied. In FIG. 1, reference numeral 1 is a control unit constituted of a microprocessor and a Read Only Memory (ROM) having a program of the microprocessor stored therein. The control unit 1 controls the whole image forming device. Reference numeral 2 is a Random Access Memory (RAM) for temporary data storage. Reference numeral 3 is a nonvolatile memory (a nonvolatile RAM). A key A for encrypting a job datum (a datum to print) is stored in the nonvolatile memory 3. The key A is a unique key to the image forming device, and is set regarding the serial number of the image forming device or the like. Reference numeral 4 is a storage medium to store font data, and job data encrypted by the key A. The storage medium 4 is constituted to be removable. Reference numeral 5 is a communication unit which receives the job datum sent from a host computer via a Local Area Network (LAN) and outputs it to the control unit 1.

Reference numeral 7 is an image forming unit which forms a non-fixated toner image on a sheet made of a photoreceptor by copying the toner image. Paper, plastic or the like is used for the sheet. Reference numeral 8 is a driving unit which drives a mechanical portion to supply, discharge, and send the sheet. Reference numeral 9 is a fixation unit which fixates the non-fixated image made by the image forming unit 7 on the sheet. The fixation unit 9 maintains the heat generation required for fixation of the non-fixated image during a standby state. Therefore, the image forming device is ready for an immediate image forming without warm up.

Figure 2:
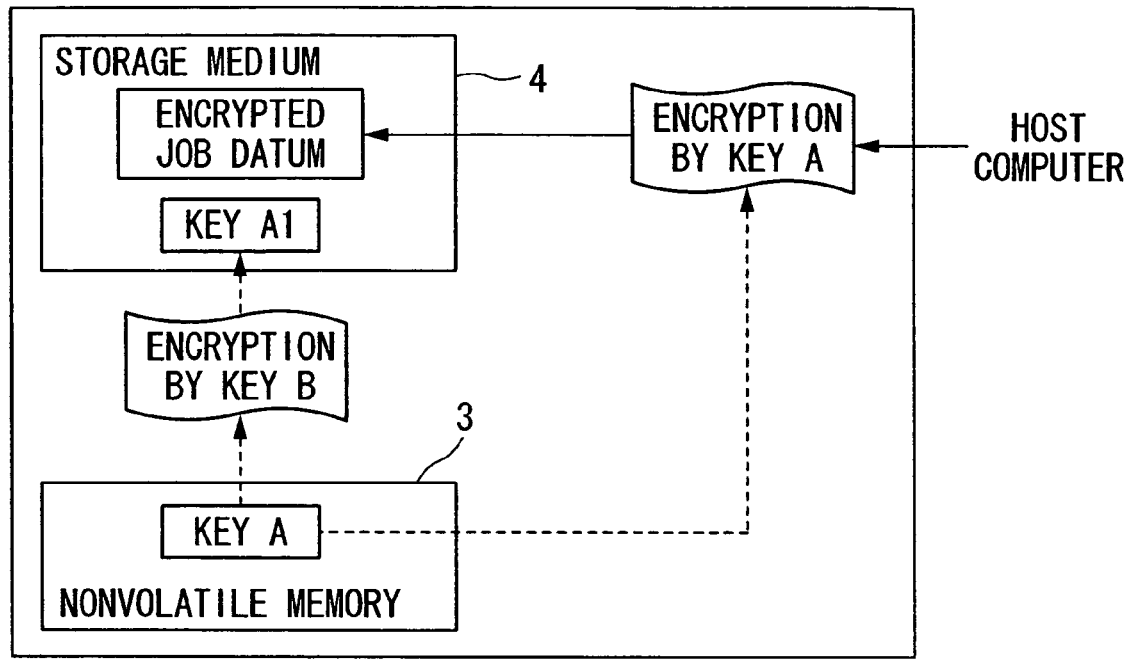
FIG. 2 is an explanatory drawing showing operations of the first embodiment.
Figure 3:
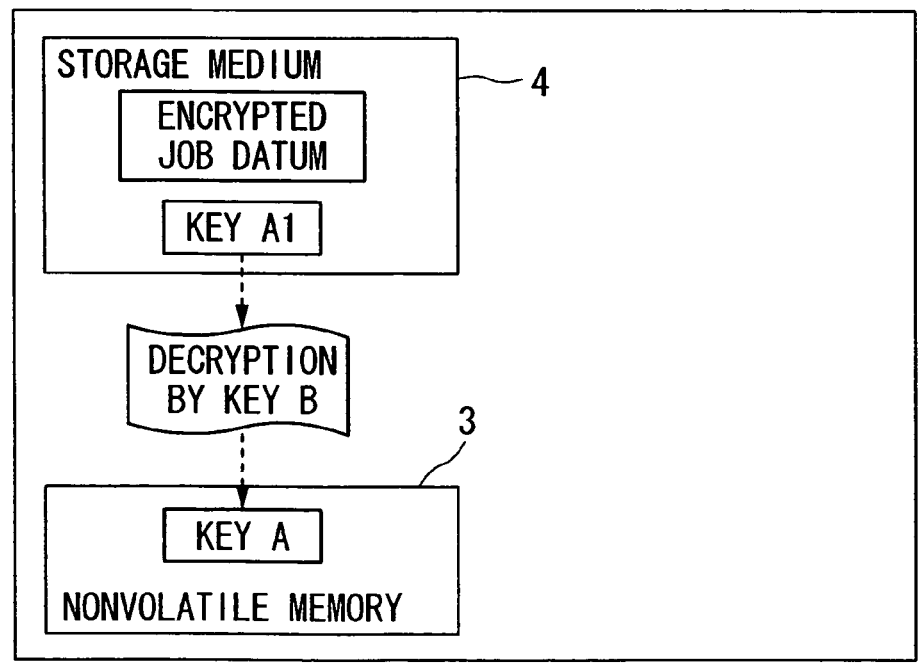
FIG. 3 is an explanatory drawing showing operations of the first embodiment.

Next, writing and reading operations of the storage medium 4 of the aforementioned image forming device are described with reference to FIGS. 2 and 3. The control unit 1 reads the key A from the nonvolatile memory 3 when formatting the storage medium 4. Then the control unit 1 encrypts the key A by a key B stored in the ROM and writes a key A1 obtained by the encryption of the key A in the storage medium 4, as shown in FIG. 2. After that, when a job datum is input to the control unit 1 from a host computer via the communication unit 5, the control unit 1 encrypts the job datum by the key A in the nonvolatile memory 3 and writes it in the storage medium 4. When printing, the control unit 1 reads the encrypted job datum in the storage medium 4, decrypts it by the key A, and outputs it to the image forming unit 7. As described above, the key A is a unique key to each image forming device. Therefore, the job datum cannot be printed even if the storage medium 4 is set to another image forming device of the same specification.

When the key A is broken due to an error in operation or the like, the control unit 1 reads the key A1 from the storage medium 4, decrypts it by the key B, and writes the key A obtained by the decryption to the nonvolatile memory 3.

In the aforementioned embodiment, a job datum is encrypted by the key A which is unique to each image forming device, and stored in the storage medium 4. Therefore, security is maintained because the job datum cannot be printed even if the storage medium 4 is stolen. In addition, the key A1, obtained by encrypting the key A by the key B in the control unit 1, is stored in the storage medium 4 in this embodiment. Therefore, there is no risk that the key A1 is decrypted by the key B when the storage medium 4 is stolen. At the same time, when the key A in the nonvolatile memory 3 is broken, the key A can be immediately reproduced by decrypting the key A1 in the storage medium 4.

Figure 4:
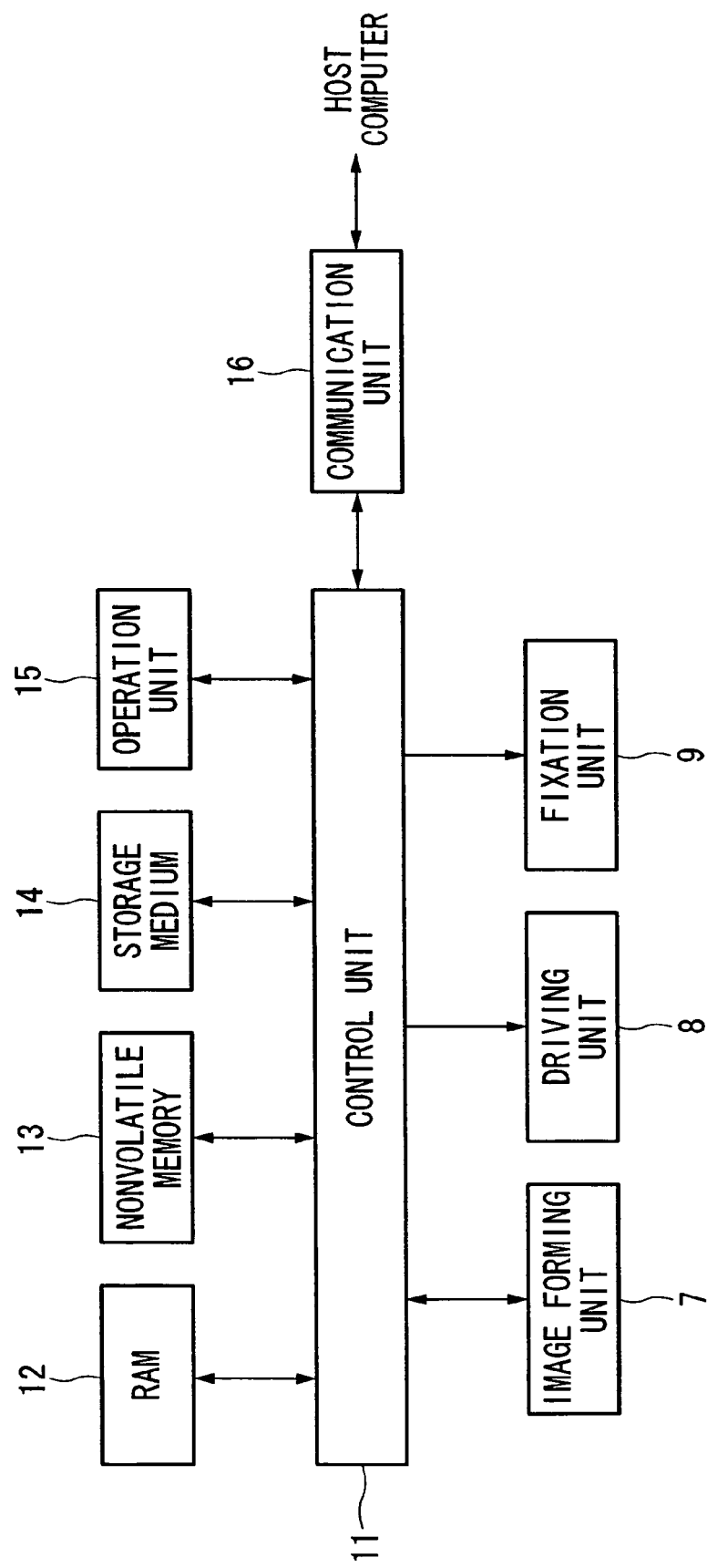
FIG. 4 is a block diagram showing an image forming device (a printer) to which a data management apparatus of a second embodiment of the present invention is applied.

Next, a second embodiment of the present invention is described hereinbelow with reference to the drawings. FIG. 4 is a block diagram showing an image forming device (a printer) to which a data management apparatus of a second embodiment of the present invention is applied. In FIG. 4, reference numeral 11 is a control unit constituted of a microprocessor and a Read Only Memory (ROM) having a program of the microprocessor stored therein. The control unit 11 controls the whole image forming device. Reference numeral 12 is a Random Access Memory (RAM) for temporary data storage. Reference numeral 13 is a nonvolatile memory (a nonvolatile RAM). A key C is stored in the nonvolatile memory 13. Reference numeral 14 is a storage medium to store font data, and a job datum (a job datum to print). The storage medium 14 is constituted to be removable. Reference numeral 15 is an operation unit and is used when a user inputs a key datum. Reference numeral 16 is a communication unit which receives the job datum sent from a host computer via a Local Area Network (LAN) and outputs it to the control unit 11. Since the image forming unit 7, driving unit 8, and fixation unit 9 are identical components to the first embodiment, descriptions thereof are omitted.

Figure 5:
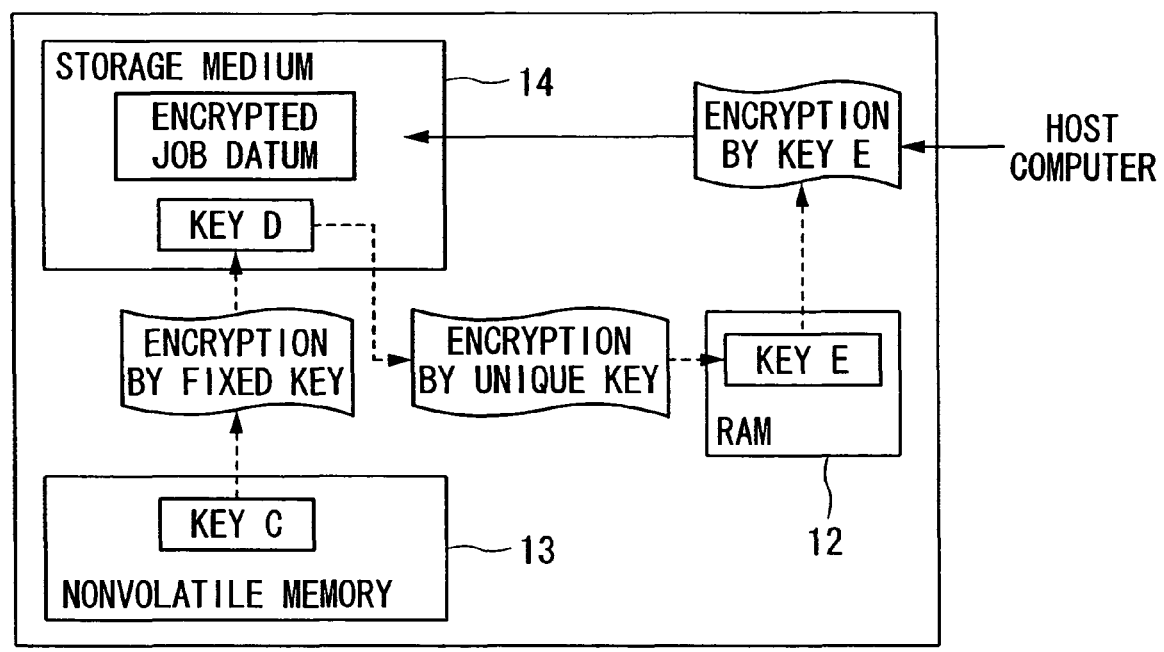
FIG. 5 is an explanatory drawing showing operations of the second embodiment.

Next, writing and reading operations of the storage medium 14 of the aforementioned image forming device are described with reference to FIG. 5. First, the user inputs a desired key datum which is used as the key C from the operation unit 15 when the storage medium 14 is formatted. The input datum is transferred to the control unit 11, and the control unit 11 writes the datum into the nonvolatile memory 13 as the key C. Then the control unit 11 reads the key C from the nonvolatile memory 13, encrypts the key C by the fixed key which is stored therein in advance, and writes a key D obtained by the encryption into the storage medium 14 as shown in FIG. 5. The fixed key is defined as a common key among image forming devices of the same specification.

When a job datum is input to the control unit 11 from a host computer via the communication unit 16, the control unit 11 encrypts the key D by a unique key which is stored therein, and writes it into the RAM 12 as a key E (refer to FIG. 5). The unique key is defined as a key which is unique to the image forming device, and is set in advance based on a manufacturing number, a serial number or the like. After that, the control unit 11 encrypts the input job datum by the key E in the RAM 12 and writes the encrypted datum into the storage medium 14. When encryptions of all the job data are terminated, the control unit 11 deletes the key E in the RAM 12.

When printing the job datum in the storage medium 14, the control unit 11 generates the key E by encrypting the key D as described above, writes the key E into the RAM 12. Then, the control unit 11 reads the encrypted job datum in the storage medium 14, decrypts it by the key E, and outputs the decrypted job datum to the image forming unit 7. When the decryption of the job datum in the storage medium 14 is terminated, the control unit 11 deletes the key E in the RAM 12.

As described above, the key E is generated by being encrypted by the unique key. Therefore, even if the storage medium 14 is set in an image forming device of the same specification, the datum therein can be neither decrypted nor printed. In addition, since the key E is generated only when it is needed and is deleted after using, it enables a higher security than a conventional device.

Though the key E is used for encryption and decryption in the aforementioned embodiment, a pair of keys for encryption and decryption may be used. In addition, though the key E is generated by encrypting the key D in the aforementioned embodiment, the key E may be generated by encrypting the key C. Furthermore, although an HDD is used as the storage medium in these aforementioned embodiments, a memory card, an optical disc, a magnetooptical disc or the like may be used instead of the HDD.

Next, a third embodiment of the present invention is described hereinbelow with reference to the drawings. FIG. 6 is a block diagram showing an image forming device (a printer) to which a data management apparatus of a third embodiment of the present invention is applied. In FIG. 6, reference numeral 21 is a control unit constituted of a microprocessor and a Read Only Memory (ROM) having a program of the microprocessor stored therein. The control unit 21 controls the whole image forming device. Reference numeral 22 is a Random Access Memory (RAM) for temporary data storage. Reference numeral 23 is a nonvolatile memory (a nonvolatile RAM). An encryption key for encrypting a job datum (a datum to print) is stored in the nonvolatile memory 23. The encryption key is a unique key to the image forming device and is set based on a master key of an identification number (ID number) of the image forming device when the image forming device is turned on. Reference numeral 24 is a storage medium (HDD) to store the encrypted job datum. In the storage medium 24, a key which is identical to the encryption key is saved as an authentication key. The storage medium 24 is constituted to be removable. Reference numeral 25 is a communication unit which receives the job datum sent from a host computer via a Local Area Network (LAN) and outputs it to the control unit 21. Since the image forming unit 7, driving unit 8, and fixation unit 9 are identical components to the first embodiment, descriptions thereof are omitted.

Next, operations of the aforementioned image forming device are described with reference to FIGS. 7A to 9.

Figure 7A:
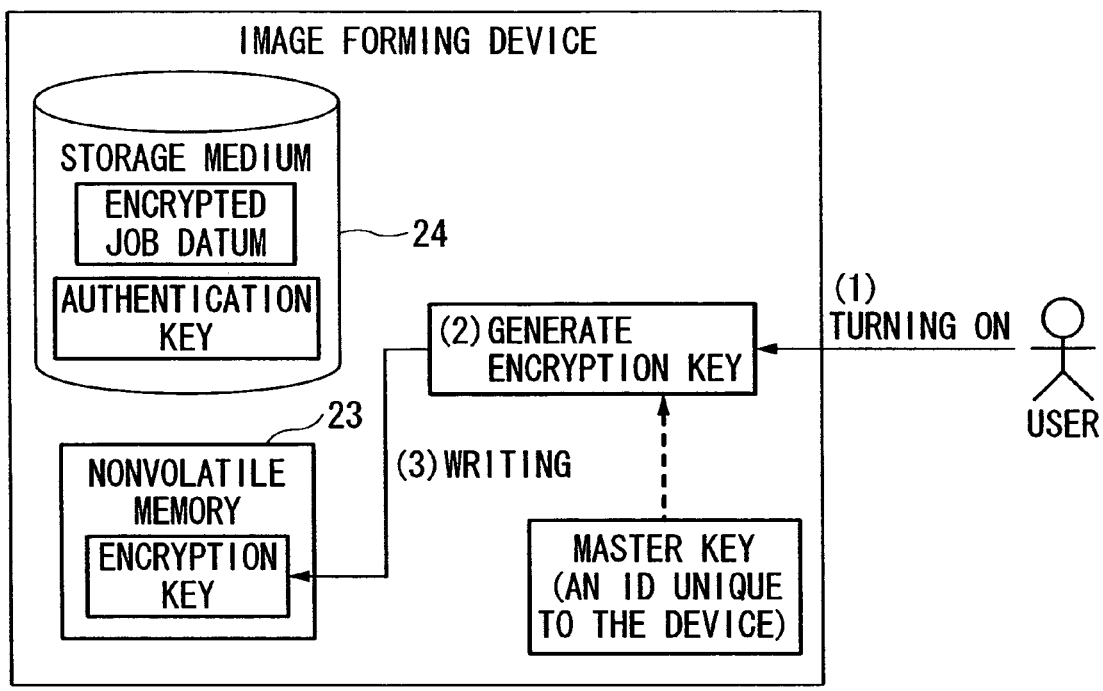
FIGS. 7A and 7B are explanatory drawings showing operations according to the third embodiment.
Figure 7B:
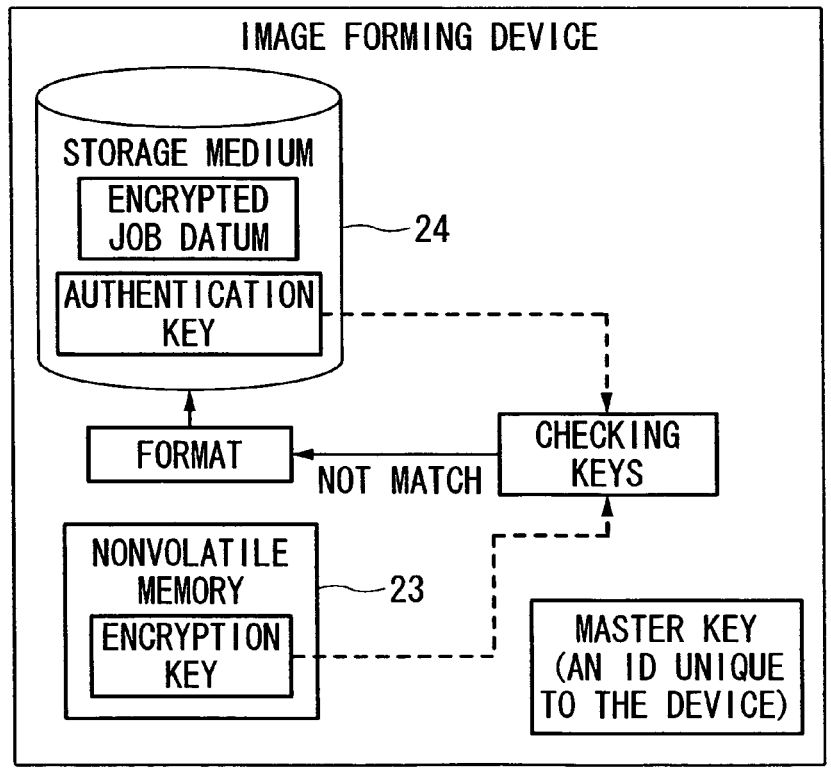

(1) Operations when Turning On (FIGS. 7A and 7B)

When the image forming device is turned on by the user, the control unit 21 reads the master key (an ID which is unique to the device) saved in the ROM and generates the encryption key by carrying out a calculation on the master key based on the predetermined algorithm. The control unit writes the encryption key in the nonvolatile memory 23 (refer to FIG. 7A).

Next, the control unit 21 reads the authentication key from the storage medium 24 and checks it with the encryption key in the nonvolatile memory 23. When the authentication key and the encryption key are identical, the storage medium 24 is determined to be an appropriate one, and the operation proceeds to a reading/writing step which is described hereinafter. When the authentication key and the encryption key are not identical, the storage medium 24 is determined to be an inappropriate one, and the storage medium 24 is formatted. Then, a new authentication key is generated by carrying out a calculation on the master key in the ROM based on the aforementioned algorithm. The new authentication key is written in the storage medium and the operation proceeds to the reading/writing step (refer to FIG. 7B).

Figure 8:
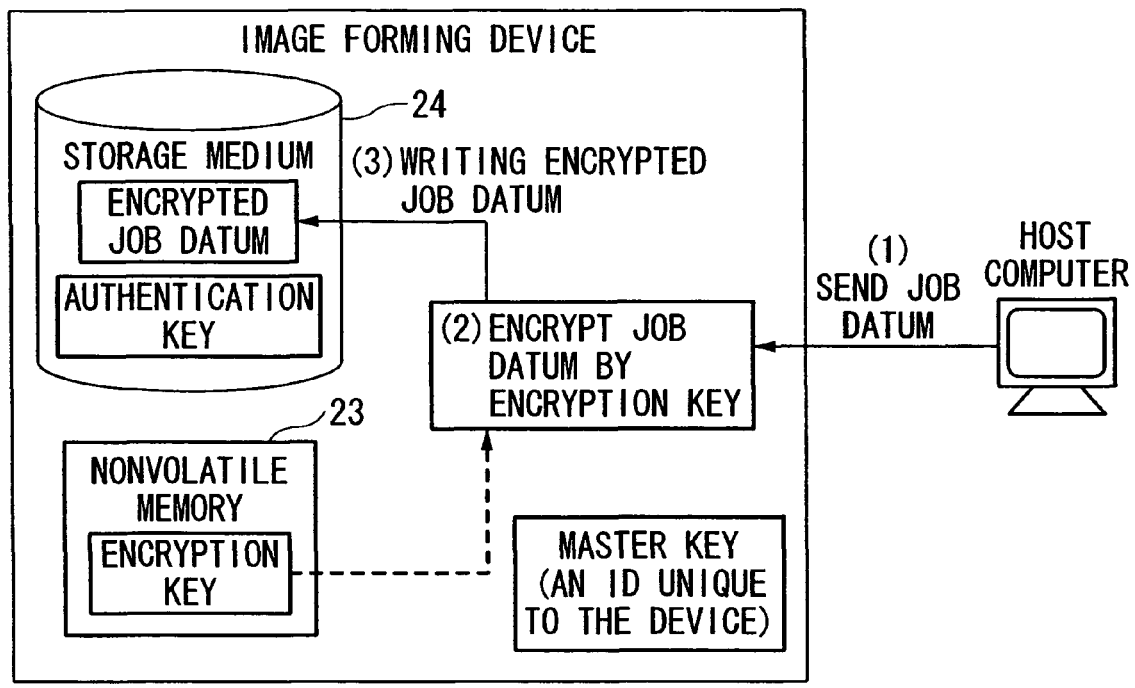
FIG. 8 is an explanatory drawing showing writing operations of the third embodiment.
Figure 9:
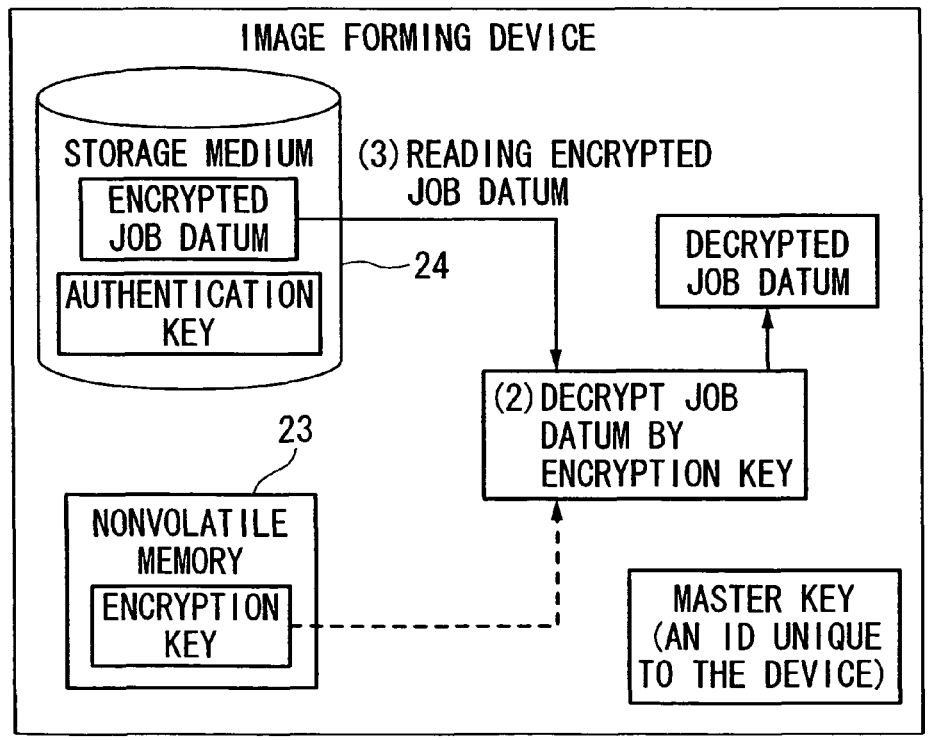
FIG. 9 is an explanatory drawing showing reading operations of the third embodiment.

(2) Reading Data from the Storage Medium and Writing Data Thereinto (FIGS. 8 and 9)

When the job datum in the host computer is printed, the user selects the job datum and inputs a command to print to the host computer. The host computer receives the command to print and sends the selected job datum to the image forming device via a LAN. The control unit 21 of the image forming device receives the job datum from the host computer and saves it in the RAM 22 temporally. The control unit 21 reads the encryption key from the nonvolatile memory 23, encrypts the job datum by the encryption key, and writes the encrypted job datum in the storage medium 24 (refer to FIG. 8).

When the job datum is printed, the control unit 21 reads the encrypted job datum from the storage medium 24, decrypts it by the encryption key in the nonvolatile memory 23 (refer to FIG. 9), and sends the decrypted job datum to the image forming unit 7. The job datum is thus printed.

As described above, the encryption key is generated based on the master key (an ID which is unique to the device) when the image forming device is turned on in this embodiment, and even if the encryption key is broken during operations of the image forming device, the encryption key can be immediately reproduced by turning the image forming device on again. Therefore, there is no risk of the image forming device becoming out of order. In addition, since the authentication key is saved in the storage medium 24 and it is checked whether the authentication key is identical to the encryption key when the device is turned on, an inappropriate storage medium can be detected. Furthermore, since the storage medium is formatted and an appropriate authentication key is written therein when the storage medium is determined to be inappropriate, the storage medium can be used again immediately.

In the aforementioned embodiment, although an ID which is unique to the image forming device is used as the master key, the master key may be set by the user. In addition, although an identical key is used as the encryption key and the authentication key in the aforementioned embodiment, these keys may be respectively generated by different algorithms.

In this case, both keys have to be decrypted when checking. Furthermore, although an HDD is used as the storage medium in the aforementioned embodiment, a memory card, an optical disc, a magnetooptical disc or the like may be used instead of HDD.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A data management apparatus comprising:
   a removable storage device;
   a nonvolatile memory which is configured and operable to save a first conversion key;
   a first encrypting device having a second conversion key, the first encrypting device being configured and operable to encrypt the first conversion key by the second conversion key, and configured and operable to convert the first conversion key into a third conversion key, the third conversion key being the encrypted first conversion key;
   a first writing device which is configured and operable to write the third conversion key into the storage device;
   a second encrypting device having a fourth conversion key which is different from the second conversion key, the fourth conversion key being a unique key to the data management apparatus, the second encrypting device being configured and operable to encrypt the third conversion key by the fourth conversion key and configured and operable to convert the third conversion key into a fifth conversion key, the fifth conversion key being the encrypted third conversion key;
   a datum encrypting device which is configured and operable to convert a datum to be saved in the storage device into an encrypted datum by the fifth conversion key;
   a datum writing device which is configured and operable to write the encrypted datum into the storage device;
   a datum reading device which is configured and operable to read the encrypted datum from the storage device;
   a datum decrypting device which is configured and operable to decrypt the encrypted datum by the fifth conversion key; and
   a deleting device which is configured and operable to delete the fifth conversion key after encryption by the datum encrypting device and after decryption by the datum decrypting device.

2. A computer program stored on a non-transitory storage medium for a computer having a removable storage device and a nonvolatile memory which saves a first conversion key, and the computer program when executed by a processor, performing steps comprising:
   a first instruction of encrypting the first conversion key by a second conversion key, and converting the first conversion key into a third conversion key, the third conversion key being the encrypted first conversion key;
   a second instruction of writing the third conversion key into the storage device;
   a third instruction of encrypting the third conversion key by a fourth conversion key which is different from the second conversion key, and converting the third conversion key into a fifth conversion key, the fourth conversion key being a master key unique to the computer, the fifth conversion key being the encrypted third conversion key;
a fourth instruction of converting a datum to be saved in the storage device into an encrypted datum by the fifth conversion key;
a fifth instruction of writing the encrypted datum into the storage device;
a sixth instruction of reading the encrypted datum from the storage device;
a seventh instruction of decrypting the encrypted datum by the fifth conversion key; and
an eighth instruction of deleting the fifth conversion key after encryption of the datum and after decryption of the encrypted datum.

3. A method for data management which is applicable to a computer having a processor and having a removable storage device and a nonvolatile memory which saves a first conversion key, the method for data management when executed by a processor, performing the steps of:
a first step of encrypting the first conversion key by a second conversion key, and converting the first conversion key into a third conversion key, the third conversion key being the encrypted first conversion key;
a second step of writing the third conversion key into the storage device;
a third step of encrypting the third conversion key by a fourth conversion key which is different from the second conversion key, and converting the third conversion key into a fifth conversion key, the fourth conversion key being a master key unique to the computer, the fifth conversion key being the encrypted third conversion key;
a fourth step of converting a datum to be saved in the storage device into an encrypted datum by the fifth conversion key;
a fifth step of writing the encrypted datum into the storage device;
a sixth step of reading the encrypted datum from the storage device;
a seventh step of decrypting the encrypted datum by the fifth conversion key; and
an eighth step of deleting the fifth conversion key after encryption of the datum and after decryption of the encrypted datum.

* * * * *